United States Patent [19]

Seidel

[11] 4,085,298

[45] Apr. 18, 1978

[54] MEASUREMENT OF CURRENT THROUGH A LINE SUBJECT TO SPURIOUS HIGH POTENTIALS

[75] Inventor: Harold Seidel, Warren, N.J.

[73] Assignee: Bell Telephone Laboratories, Incorporated, Murray Hill, N.J.

[21] Appl. No.: 700,312

[22] Filed: Jun. 28, 1976

[51] Int. Cl.² ........................ H04B 3/46; H04M 3/00
[52] U.S. Cl. ............................ 179/175.3 R; 179/18 F
[58] Field of Search ......... 179/175.3 R, 18 F, 18 FA, 179/16 F; 324/59, 60 R, 76 R

[56] References Cited

U.S. PATENT DOCUMENTS

| 3,321,583 | 5/1967 | Maul | 179/18 FA |
| 3,624,316 | 11/1971 | Roberts | 179/175.3 R |
| 3,671,676 | 6/1972 | Henry et al. | 179/16 F |

OTHER PUBLICATIONS

BSTJ Sept. 1964, pp. 2255-2261.
Operational Amplifiers—Design and Applications, 1971 by Graeme et al., p. 93.

Primary Examiner—Douglas W. Olms
Attorney, Agent, or Firm—Robert O Nimtz; Henry T. Brendzel

[57] ABSTRACT

A current measuring circuit comprising a signal sensitive element to which a portion of the measured current is coupled, which signal sensitive element has a readily measurable parameter that varies as a function of the signal applied thereto, and a measuring circuit capacitively coupled to the signal sensitive element for measuring the selected signal sensitive parameter.

8 Claims, 2 Drawing Figures

MEASUREMENT OF CURRENT THROUGH A LINE SUBJECT TO SPURIOUS HIGH POTENTIALS

BACKGROUND OF THE INVENTION

This invention relates to apparatus for measuring electrical operating conditions of a circuit and, more particularly, to apparatus for measuring electrical operating conditions of a circuit through alternating current (ac) probing. In the context of this invention, ac probing means applying ac signals to a circuit and observing the circuit's response to the applied ac signals.

Measurement of an electrical operating condition in a circuit can be made directly or indirectly. A direct measurement of current, for example, can be made by inserting a current meter in series with the line and by observing the deflection of the meter. An indirect measurement of current, for example, can be made by placing a small resistor in series with a line and by measuring the voltage developed across the resistor. Direct and indirect voltage measurements can be accomplished by analogous techniques.

Although the above measurement methods permit good measuring accuracy, they provide poor isolation between the measured circuit and the measuring circuit. Therefore, these measuring methods are poorly suited for circuit applications where the operating condition measured is subject to potentially destructive large voltage transients and where, therefore, good isolation between the measuring and measured circuits is desired.

One application where such isolation is desired is in the telephone network, where customer lines are sensed for current flow which indicates that a phone is "off-hook." For such a telephone application, C. F. Ault in U.S. Pat. No. 3,889,069, issued June 10, 1975, discloses a circuit which can detect current and which can simultaneously provide isolation to protect the measuring circuit from spurious high voltages (e.g., lightning induced voltages). The Ault circuit comprises a magnetic element having a winding to which the tested line is connected, an interrogate winding for developing pulses and a sense winding. When no current flows through the tested line, a pulse developed by the interrogate winding is inductively coupled to the sense winding and detected therein. When a current does flow through the tested line, the magnetic element becomes saturated by the current flowing through the winding to which the tested line is connected and the interrogate winding pulses to not, therefore, couple to the sense winding.

The desired isolation is indeed achieved by the Ault circuit. However, the circuit is expensive, cumbersome and lacks the ability to accurately indicate the current's value.

It is an object of this invention, therefore, to provide a circuit for measuring a line's signal while maintaining sufficient isolation therefrom to protect the measuring circuit from potentially destructive spurious voltages appearing on the measuring line.

SUMMARY OF THE INVENTION

This and other objects of the invention are achieved with a circuit having a signal sensitive element coupled to the tested line, with the signal sensitive element being arranged to tolerate large spurious voltages impressed on the tested line. A current sensitive element is an element which has a readily measurable parameter, e.g., impedance, that varies as a function of the signal applied thereto. Isolation from the tested line and measurement of the tested line's signal is provided by decoupling the signal sensitive element with a pair of capacitors and by measuring the signal variable parameter of the signal sensitive element with an ac measuring circuit.

A more thorough understanding of this invention may be had by perusing the following detailed description of a current measuring circuit configured in accordance with the principles of this invention, together with the appended drawing in which:

DETAILED DESCRIPTION

Figure 1:
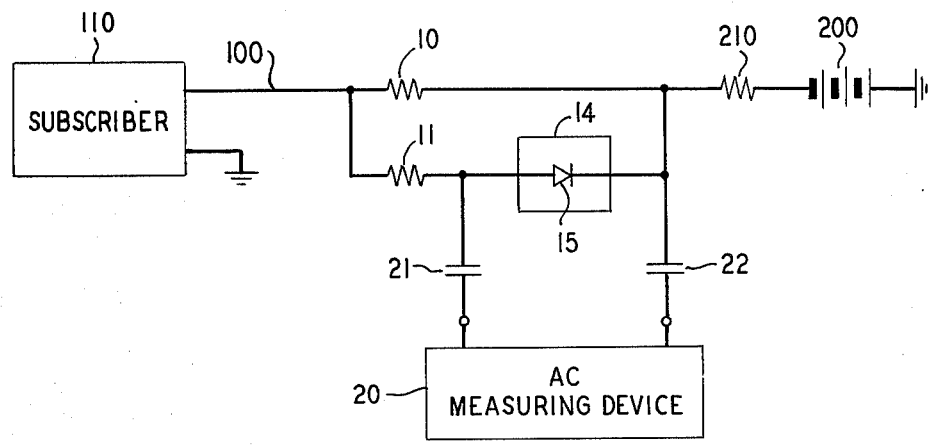
FIG. 1 illustrates one embodiment of a current measuring circuit in accordance with the principles of this invention.

FIG. 1 depicts a current measuring circuit in which a signal path 100 is connected between a subscriber 110 and a central office containing a resistor 210 representing the wire resistance of path 100 and a battery 200 in series with resistor 210. In accordance with the principles of this invention, a resistor 10 is interposed in signal path 100, and across resistor 10 there is connected a circuit branch comprising a resistor 11 in series with a signal sensitive element 14. In the context of this disclosure, a signal sensitive element is an element having a parameter that changes as a function of the driving signal, e.g., current or voltage. In FIG. 1, signal sensitive element 14 comprises a diode 15 arranged to be forward biased in the direction of current flow from battery 200. Further in accordance with the principles of this invention, across element 14 there is connected a circuit branch comprising a capacitor 21 connected between one lead of element 14 and one lead of a measuring device 20 and a capacitor 22 connected between the other lead of element 14 and the other lead of measuring device 20.

In describing the operation of the FIG. 1 circuit, it may be useful to first consider diode 15 and its characteristics.

Being an ordinary diode, diode 15 follows the well known exponential current-voltage relationship, $$I = I_s(\exp(qV/kT) - 1) \quad (1)$$

where $I_s$ is the saturation current, $q$ is the magnitude of an electronic charge, $T$ is the absolute temperature and $k$ is Boltzmann's constant. *Physical Electronics and Circuit Models,* Gray et al., John Wiley & Sons, Inc., 1967.

From equation (1), the diode's absolute resistance, $V/I$, and incremental resistance, $dV/dI$, may be derived; from which it may be seen that $V/I$ is a transcendental function of I and that $dV/dI$ is inversely proportional to I. To wit, $$\frac{V}{I} = \frac{kT}{qI} \ln\left(\frac{I}{I_s} + 1\right) \quad (2)$$

and $$\frac{dV}{dI} = \frac{kT}{q(I + I_s)} \quad (3)$$

When a diode is biased in a forward direction, in addition to a resistance as defined by equations (2) and (3), it displays a capacitance $C_D$, termed diffusion capacitance, which results from a delay in recombination of holes and electrons. *Electronics,* Chirlian et al, McGraw-Hill, Inc., 1961, Sec. 5-6. This capacitance is inversely proportional to the incremental resistance $$\text{(i.e., } C_D = \frac{K}{\frac{dV}{dI}} \text{)}$$

and is therefore (equation (3)) directly proportional to the current I.

When a diode is biased in the reverse direction or only slightly in the positive direction, it displays a capacitance $C_j$, termed junction capacitance which results from the charge stored in the depletion layer. As described in the aforementioned publication by Gray et al, pg. 96, the capacitance of a linearly graded junction has the form $C_j = K (\psi_o - V)^{-\frac{1}{3}}$ where K is a constant and $\psi_o$ is the contact potential, ranging between 0.2 volts and 1 volt in typical pn junctions.

Referring back to FIG. 1, when subscriber 110 is "on-hook," no current flows through signal path 100, no current flows through diode 15 and no voltage is developed across it. Since diode 15 is operating at zero forward current, its incremental resistance is very high $(kT/qI_s)$, its diffusion capacitance is very low and its depletion layer capacitance is also fairly high (K $\psi_o^{-\frac{1}{3}}$).

When subscriber 110 is "off-hook," a path to ground is established through subscriber 110 causing a current of about 4 mA to normally flow through path 100, as controlled by battery 200 and resistor 210. In accordance with the principles of this invention, the value of resistor 10 is chosen to be small enough to insubstantially affect the 4 mA current and much smaller than the value of resistor 11. Consequently, essentially all of the 4 mA current flows through resistor 10 and very little current flows through resistor 11 and diode 15. For example, with a resistor 10 being equal to 30 ohms and resistor 11 being equal to 30 Kohms, the 4 mA current develops 120 mv across resistor 10, and the developed 120 mv are divided between resistor 11 and diode 15 based on the diode's characteristics. For a diode having $I_s = 1\mu A$, the voltage developed across the diode is approximately 88 mv and the current through resistor 11 (and diode 15) is approximately 32.5 mA. At this level of current, the diode's incremental resistance is $(kT)/q(33.5 \times 10^{-6})$ ohms as compared to $(kT)/q(1 \times 10^{-6})$ ohms when the diode is "off" (subscriber "on-hook"). This corresponds to about a 33 fold reduction in the incremental resistance of the diode. As for the junction capacitance, at 88 mv $C_j$ is $K(\psi_o - 88 \times 10^{-3})^{-\frac{1}{3}}$ as compared to $K\psi_o^{-\frac{1}{3}}$ when the diode is "off," which for $\psi_o = 0.2$ volts, corresponds to approximately a 21 percent increase in capacitance.

The above current induced changes in the resistance and capacitance parameters of diode 15 are measured, in accordance with this invention, with measuring device 20 which is capacitively coupled to diode 15 through capacitors 21 and 22. Capacitors 21 and 22 provide direct current (dc) isolation between measuring device 20 and the direct currents of signal path 100, but they do not isolate device 20 from voltage transients caused by the aforementioned induced voltages. However, it should be noted that since the voltage of the diode 15-capacitor 22 junction remains essentially constant when a high voltage is induced on signal path 100 and, since the diode voltage does not increase substantially, the transient voltages passed through capacitors 21 and 22 are low enough not to endanger device 20.

Figure 2:
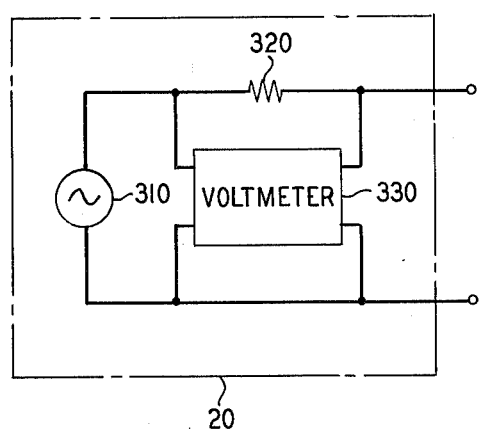
FIG. 2 depicts one embodiment of element 20 in FIG. 1.

Device 20 is a measuring circuit which by ac probing measures a selected characteristic of the path comprising capacitor 21, diode 15 and capacitor 22. In the case of FIG. 1 where the signal sensitive device is diode 15, measuring device 20 may be a device for measuring incremental (ac) resistance, capacitance, or impedance. Ac probing, in the context of this disclosure, is testing by means of ac signals. That is, ac signals are generated within device 20, are applied to the output port of device 20 and the signal behavior at that port is measured to ascertain the value of the tested parameter. If testing of impedance (of diode 15) is desired, device 20 may simply comprise, as shown in FIG. 2, an ac voltage source 310, which in series with resistor 320 is connected across the input port of device 20 and a vector voltmeter 330 interconnected to measure the voltage magnitude and phase at the input relative to the voltage magnitude and phase of signal source 310. Source 310 may have any convenient frequency to which capacitors 21 and 22 present a relatively insignificant impedance, and voltmeter 330 may be any commercial vector voltmeter such as the HP model 8405A.

In applications where simply an "on-hook"-"off-hook" decision is sought to be made, voltmeter 330 may be substituted with a threshold circuit which would assume one state when the voltage at the port of device 20 is at one value (magnitude and phase), and another state when the voltage is at another value. Alternatively, device 20 may comprise a bridge network, e.g., a Wien bridge, with a threshold detector which would determine whether an "on-hook" or "off-hook" condition exists.

One stated objective of this invention is the development of a current detection circuit which would not be damaged when large spurious voltages are induced on the signal path 100. This objective is indeed achieved by the circuit of FIG. 1 as demonstrated by the following example. When a 600 volt potential is induced in path 100, at most the full 600 volts are impressed across resistor 10, generating thereby a current through the branch of resistor 11 that is, at most, equal to $600/R_{11}$ where $R_{11}$ is the value of resistor 11. When $R_{11}$ equals 30 Kohms, the maximum current flowing through resistor 11 and diode 15 (with 600 volts induced) is 20 mA, which is sufficiently small not to cause diode 15 to be damaged. When the induced 600 volt potential is positive, the 20 mA current flows in the forward diode direction and, employing the diode characteristics used above, the voltage developed across diode 15 is approximately 0.25 volts. When the induced 600 volt potential is negative, the 20 mA current flows in the reverse direction of diode 15 and the voltage developed across the diode is the zener breakdown voltage. Diode 15 may conveniently be chosen to have a relatively low zener voltage, e.g., 12 volts, to avoid excessive power dissipation.

It is to be understood that the embodiment shown and described above is merely illustrative of the principles of this invention and that various modifications may be made by those skilled in the art without departing from the spirit and scope of this invention. For example, device 14 may be a zener diode arranged not to conduct any current under normal operating conditions (when a current of only 4 mA flows through signal path 100).

Device 14 may also comprise two or more back-to-back diodes connected in parallel, two or more back-to-back diodes connected in series, or still some other drive sensitive element such as a veractor or a saturable reactor. Also, resistor 11 may, for example, be split into two resistors with one resistor connected to each side of device 14, and one of the decoupling capacitors may be eliminated to provide only partial decoupling.

What is claimed is:

1. A direct current measuring circuit comprising:
   a signal sensitive element;
   means for coupling a portion of said direct current to said signal sensitive element; and
   means, coupled through solely capacitive means to said signal sensitive element for measuring a preselected parameter of said signal sensitive element.

2. Apparatus for measuring current through a signal path comprising:
   a first impedance connected in series with said signal path;
   a circuit branch connected in parallel with said first impedance, said circuit branch including a signal sensitive device connected in series with a second impedance; and
   measuring means connected to said signal sensitive device through solely capacitive means for measuring a preselected parameter of said signal sensitive device.

3. The apparatus of claim 2 wherein said signal sensitive device is a diode.

4. The apparatus of claim 3 wherein said diode is arranged to allow conduction of said current or a fraction thereof.

5. The apparatus of claim 2 wherein said second impedance is of greater magnitude than said first impedance.

6. The apparatus of claim 2 wherein the ratio of said second impedance to said first impedance is in excess of 100.

7. The apparatus of claim 2 wherein said measuring means measures the incremental impedance of said signal sensitive device.

8. The apparatus of claim 7 wherein said measuring means comprises:
   a first capacitor connected between one lead of said signal sensitive device and a first terminal;
   a second capacitor connected between the other lead of said signal sensitive device and a second terminal; and
   means connected across said first and second terminals for measuring the incremental impedance between said first and second terminals.

* * * * *